United States Patent Office 3,003,982
Patented Oct. 10, 1961

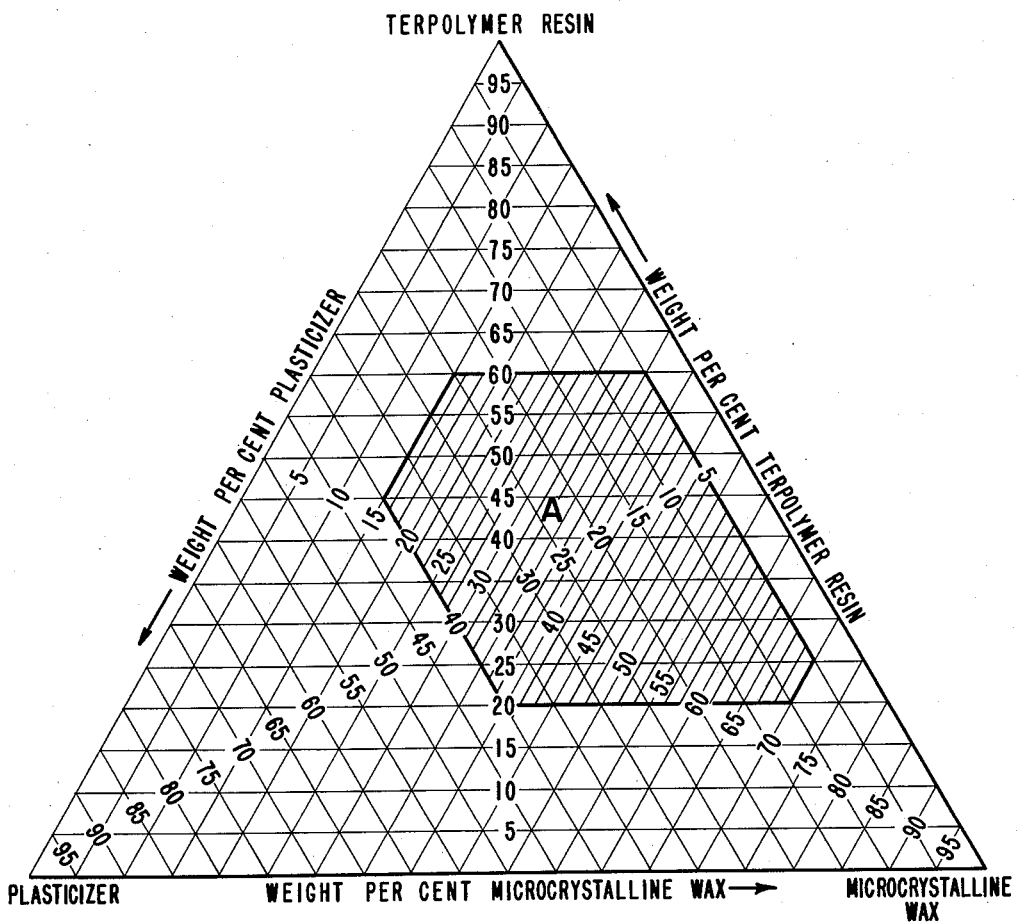

3,003,982
VINYL RESIN COATING COMPOSITIONS AND PROCESS FOR COATING POLYMERIC FILMS
William Bryan Lindsey, Tonawanda, N.Y., assignor to E. I. du Pont de Nemours and Company, Wilmington, Del., a corporation of Delaware
Filed Apr. 24, 1959, Ser. No. 808,772
18 Claims. (Cl. 260—28.5)

This invention relates to the coating of thermoplastic polymeric films and, more particularly, to a novel coating composition that provides a versatile coated film for packaging purposes.

One of the fundamental requirements of a general purpose packaging film is that it be readily heat-sealable in commercial packaging equipment, i.e., easily sealed by heating during the preparation of the film package. Ordinarily, heat-sealing cannot be performed directly on the films. That is, simply melting two edges of film and applying pressure does not usually serve to seal the edges. Some films decompose below their melting point, e.g., cellophane. Other films, which must be used in an oriented state to provide adequate physical properties, lose orientation when melted and form puckered, brittle heat-seals.

To avoid the above-mentioned difficulties, the packaging film art has developed compositions for coating the film, the composition serving as the heat-sealing medium. The requirements of a useful coating composition are: that it adhere tenaciously to the base film; that it provide a heat-sealing temperature substantially below any temperature that would affect the base film adversely; that it is easily applied; and that it is economical.

One useful coating composition for polymeric film, although not widely used as a heat-sealing medium, is composed of a polymer of a vinyl halide, a vinyl ester and a small quantity of an alpha, beta-mono-olefinic carboxylic acid. As disclosed in U.S. Patent 2,329,456, such coatings are light-stable, heat-stable, strong, tough, flexible, colorless, odorless, non-toxic, etc. The use of the alpha, beta-mono-olefinic carboxylic acid improves the adhesion of the coatings markedly. However, the compositions are not useful for heat-sealing films at temperatures below 100° C. Hence, they cannot be used with most oriented thermoplastic films, particularly not with oriented polyvinyl chloride film. Oriented polyvinyl chloride film coated with such vinyl resin coating compositions tends to pucker and to become embrittled at the seal when heat-sealed at temperatures above about 80° C.

It is an object of the present invention to provide a vinyl resin coating composition that will retain all the desirable properties of the prior art vinyl resin coating compositions (transparency, non-toxicity, adhesiveness, light and heat stability, toughness, etc.) and will also be heat-sealable at temperatures below 100° C. down to temperatures of about 70° C. It is a further object to provide a coated film product, particularly a coated polyvinyl chloride film, that is heat-sealable below 100° C. Other objects will appear hereinafter.

The objects are accomplished by a coating composition comprising 20–60% by weight of a terpolymer (three-component polymer) of a vinyl halide, a vinyl ester of a lower saturated fatty acid, and an aliphatic alpha, beta-mono-olefinic carboxylic acid, 15–70% of a chlorinated hydrocarbon (chlorinated paraffin and chlorinated naphthalene) microcrystalline wax melting between a temperature of about 50° C. and about 100° C. and 5–40% of a plasticizer for said polymer.

The details and advantages of the invention will be apparent from the following description when read in conjunction with the accompanying figure. The figure is a triangular diagram showing the three essential ingredients of the coating composition, the hatched area "A" representing the operable relative percentages of these ingredients for preparing the coating compositions of the present invention.

The three-component polymers or vinyl resins as they will be called herein are those formed in the presence of small quantities of the alpha, beta-olefinic unsaturated acids, by the conjoint polymerization of vinyl halides, such as vinyl chloride and vinyl bromide, with vinyl esters of aliphatic acids, such as the vinyl esters of formic, acetic, propionic, and butyric acids. Particularly desirable are those resins formed from vinyl chloride and vinyl acetate which, in addition to having from about 0.1% to 10% by weight of the modifying compound, have from about 60% to about 95% by weight combined vinyl chloride in the polymer and have an average macromolecular weight of from about 6,000 to 25,000. Preferred resins within this group are those which have from about 0.3% to about 3% by weight of the modifying ingredient, a combined vinyl chloride content of from 80% to 90% by weight, and an average macromolecular weight of from 8,000 to 12,000. (Molecular weights referred to herein are those determined by means of Staudinger's formula from the specific viscosity of a dilute solution of the resin). The alpha, beta-olefinic unsaturated acid is preferably maleic acid, but this component may be any one or more of the following: methacrylic acid, acrylic acid, crotonic acid, chloro-maleic acid, phenyl maleic acid, benzyl maleic acid, itaconic acid, citraconic acid, monoesters of maleic and fumaric acid, and maleic anhydride.

The addition of a plasticizer for the resin is known to increase the flexibility of the resin coating. It has been found that the presence of plasticizer tends also to lower the effective melting point of the coating and to improve the durability of the heat-seal at low temperatures. At least 5% of the plasticizer is necessary to provide this durability. However, no more than 40%, preferably no more than 25%, of the plasticizer can be used without altering the surface characteristics of the final coated film. Above 40%, the surface becomes quite tacky, tends to block and, in short, makes the film very difficult to handle. Since there is this upper limit on the amount of plasticizer that can be used, there is a lower limit on the effective melting temperature that the addition of plasticizer can provide. This lower limit in the case of vinyl resin coating compositions is above 100° C.

As plasticizers for use in the present invention, dioctyl phthalate and tricresyl phosphate, so-called primary plasticizers, are useful up to a concentration of about 25%. The secondary plasticizers such as dicyclohexyl phthalate and "Resoflex" R-296 [1] may be used up to a concentration of about 40%. Other plasticizers which may be used in the present invention include di(2-ethyl-hexyl) adipate, polypropylene glycol adipate, methyl acetylricinoleate, dibutyl phthalate, tributyl phosphate, trioctyl phosphate, dibutyl sebacate, polypropylene glycol sebacate, epoxidized soybean oil, butadieneacrylonitrile copolymers and aromatic hydrocarbons such as Dutrex 20 [2] and Sovaloid C [3]. The preferred plasticizer may be divided into three groups: (1) dibasic acid esters which would include the phthalate, adipate, sebacate esters as well as the polypropylene glycol adipate and sebacate, (2) the polyaryl phosphates and (3) the polyalkyl phosphates.

The microcrystalline wax in the composition in combination with the plasticizer acts as the critical melt depressant to bring the effective melting point of the composition below 100° C. without adversely affecting the properties of the coated film. To do this, the microcrystalline wax must have a melting point somewhere below 100° C; it must act as a plasticizer for the vinyl resin above its melting point; it must solidify at a temperature above room temperature, preferably above 50° C.; and, as a solid, the wax must have no adverse effect on the coating resin. For oriented polyvinyl chloride which tends to shrink above 80° C., the melting point range of the combination of microcrystalline wax and plasticizer is even more limited. A range of 50° C. to about 75° C. is about the maximum range that can be tolerated.

Among the microcrystalline waxes useful in the present invention is a chlorinated paraffin, "Chlorowax" 70 (listed in Zimmerman and Levine, Handbook of Material Trade Names, Industrial Research Services, Inc., 1953). This chlorinated paraffin is a crystalline compound with a relatively sharp melting point around 100° C. Other low melting waxes which are useful include chlorinated naphthalene waxes such as "Halowax" (a chlorinated naphthalene listed in Zimmerman and Levine, Handbook of Material Trade Names, Industrial Research Services, Inc., 1953) and other chlorinated aromatic compounds. Thus, the microcrystalline wax may be defined as a solid, chlorinated hydrocarbon compatible with the other coating ingredients and having a melting range of no more than 10° C., the melting range falling between the temperatures of 50° C. and about 100° C.

To derive the maximum benefit from the microcrystalline wax it is necessary that the weight ratio of wax to resin be within the range of about 0.4 to 3.0, i.e., 15-70% by weight in the final coating composition. Compositions containing less than 15% of the wax will provide heat-sealability only at excessively high temperatures. Compositions containing more than 70% of the wax display poor flexibility and low resistance to cracking upon sharp creasing.

In addition to the essential components discussed above, it may also be desirable to add other components particularly where it is desired to impart special characteristics to the coating. For example, poly-N-vinyl pyrrolidone, which is shown in some of the examples, confers additional compatibility to the constituents of the coating tending further to lower its melting point. This compound also acts as a static depressant.

If slip poses a problem, slip agents such as hydrocarbon paraffins having a molecular weight of 1,000-6,000 and esters or amides of acids having 14-18 carbon atoms may be used. These slip agents serve to reduce the coefficient of slide friction between the final coated sheets of film. Where needed, these agents may be used in amounts up to about 5% of the total coating weight. Examples of particular slip agents include the following: "Armid" HT [4], "Aristowax" [5], "Acrawax" [6], "Armowax" [7], carnauba wax and stearic acid.

The coating compositions of the present invention may be applied to the base films to a thickness of 0.05-1 mil. The preferred ultimate coating thickness is from 0.1-0.5 mil although improvements are apparent at a coating thickness of only 0.05 mil and are retained to a coating thickness of 1 mil or higher.

The compositions may be applied using solvent or lacquer coating techniques or by melt extruding the final composition onto the base film. Where the solvent coating method is used, it is desirable that the solvent be sufficiently volatile at relatively low drying temperatures and that the solvent have a minimum softening action on the base film. Suitable solvents include toluene, benzene, xylene, and the like or mixtures of these compounds with 2-methoxy-1-ethanol, ethyl acetate or isopropyl acetate.

Where the melt extrusion technique is used for applying the coating composition it may be necessary to include extrusion aids such as lubricants and thermal stabilizers. One useful lubricant is "Lubricin" V-3 (a modified castor oil as listed in Zimmerman and Levine, Handbook of Material Trade Names, Industrial Research Services, Inc., 1953). Thermal stabilizers may be selected from a group that includes organotin derivatives such as dibutyl tin thioesters, aluminum, calcium and zinc salts of an organic acid mixed with a polyhydroxy compound and various terpenes, particularly those containing exomethylene groups.

The coating compositions may be used with a variety of thermoplastic polymeric films to provide durable heat-seals at low temperatures without detracting from the desirable characteristics of the base films. These coatings may be advantageously used wth the heat-shrinkable oriented films of polyvinyl chloride or dimensionally stable oriented films of polyvinyl chloride. They also may be used with various oriented polyhydrocarbon films, such as oriented polypropylene and oriented polystyrene. With these latter films somewhat higher sealing temperatures may be used if desired, although for the best seal appearance it is again preferred that the lowest temperatures giving adequate seal strength be employed.

As pointed out previously, the constituents of these resin coatings are non-toxic, thus permitting the coated films to be used as food packages. The toughness and durability of the base film are unaffected by the application of these coatings. A further advantage is that due to the excellent adhesion of the coating to heat-shrinkable base films, particularly to oriented polyvinyl chloride, there is no tendency for the coating to delaminate upon heat shrinkage of the base film to a very high degree. This feature greatly extends the usefulness of the preferred oriented heat-shrinkable polyvinyl chloride base film.

The following specific examples will serve to illustrate more clearly the nature of this invention but are not intended as a limitation thereof.

EXAMPLE 1

A coating composition was prepared by dissolving 100 parts of a terpolymer of vinyl chloride/vinyl acetate/

---

[1] A plasticizer consisting essentially of a soluble substantially non-volatile alkyd resin as listed in Zimmerman and Levine, Handbook of Material Trade Names, Supp. II, Industrial Research Services, Inc., 1957.
[2] A predominately aromatic hydrocarbon plasticizer as listed in Zimmerman and Levine, Handbook of Material Trade Names, Supp. I, Industrial Research Services, Inc., 1956.
[3] A plasticizer for rubber and vinyl resins composed of aromatic hydrocarbons as listed in Zimmerman and Levine, Handbook of Material Trade Names, Industrial Research Services, Inc., 1953.
[4] An amide based on cocoa acids listed in Zimmerman and Levine, Handbook of Material Trade Names, Industrial Research Services, Inc., 1953.
[5] A paraffin listed in Zimmerman and Levine, Handbook of Material Trade Names, Industrial Research Services, Inc., 1953.
[6] An amide containing synthetic wax as listed in Haynes Chemical Trade Names and Commercial Synonyms, 2nd edition, D. van Nostrand, 1955.
[7] A bis-naphthalene stearamide as listed in Armowax-Armids, brochure, Armour Chemical Division, 1953.

maleic acid (the ratio by weight being 86/13/1, respectively), 67 parts of "Chlorowax" 70, 37 parts of "Santicizer" B-16,[8] 5 parts of "Armid" HT and 23 parts of poly-N-vinyl pyrrolidone in a solvent. The solvent was composed of 485 parts of toluene and 365 parts of 2-methoxy-1-ethtanol.

A polyvinyl chloride film, prepared by extruding a composition containing the following ingredients: 92.5 parts polyvinyl chloride,[9] 3.5 parts "Thermolite" 31,[10] 3 parts "paraplex" G-62 [11] and 1 part calcium stearate at a temperature of 202° C. from a slot-shaped extrusion die 12¼" wide to form a film 10 mils thick into a water bath maintained at a temperature between 2° C. and 5° C. Excess surface water was removed by passing the extruded and quenched film through a set of squeeze rolls. Thereafter, the film was stretched 2.5× in the longitudinal direction by passing the film into a nip roll stretching apparatus heated at a temperature of 92° C. The film was then stretched transversely in a tentering apparatus composed of two moving, endless chains containing clips for grasping both edges of the continuously moving film, the whole apparatus maintained at about 95° C. to give a transverse direction stretch of about 2.5×.

The resulting film was then passed through a bath of the previously described coating composition. After passing through doctor rolls to remove excess coating solution, the coated film was subjected to air at a temperature of 55-60° C. to remove the solvent. The coating on both sides of the film was about 0.05 mil thick (corresponding to a coating weight of 4 grams per square meter). The coating comprised 49.0% by weight of the terpolymer, 32.8% of the chlorinated paraffin and 18.2% of the plasticizer.

When attempts had been made to heat-seal the original uncoated film of polvinyl chloride, it was necessary to use temperatures of at least 130° C. and preferably 170° C. in order to obtain even a partial seal. In such cases, an extremely puckered seal resulted, which was brittle and tore easily when stress was applied to the seal area. In contrast, the coated sample heat-sealed at 70 C. without noticeable evidence of puckering and the seal area was tough and durable. Specifically, heat-sealing was performed using a hot sealing bar (4 inches long and ⅛ inch wide) having a surface covering of glass fabric coated with polytetrafluoroethylene. The temperature of the bar was 70° C. and the seal was made at a two second dwell time under a bar pressure of 20 p.s.i. The Suter peel strength (hereinafter referred to as the "seal strength") was 830 grams per 1.5 inches.

The resulting coated film was clear, tough, and had excellent surface properties. The physical properties of the film were essentially identical to the uncoated film. Film samples slipped past one another without difficulty. Also, film samples stacked with coated sides towards coated sides under a pressure of 0.3 pound per sq. in. for 72 hours at a temperature of 45° C., were found to separate easily upon completion of the test, thus demonstrating the good non-blocking properties of the coating.

EXAMPLE 2

A coating composition was prepared as in Example 1. The plasticizer was composed of equal parts of dicyclohexyl phthalate and "Resoflex" R-296 (an alkyd resin). As the solvent, benzene alone was used. In all other respects, the procedure was identical to that described in Example 1.

Polyvinyl chloride film coated as in Example 1 gave heat-seals of more than 400 grams per 1.5 inches at sealing temperatures of 70° C., and more than 900 grams per 1.5 inches at 80° C., when tested at room temperature. The resulting seals exhibited minimum shrinkage. The seal strength when tested at 0° F. was also satisfactory, being greater than 600 grams per 1.5 inches, for a seal made at 80° C. The physical properties of the base film were essentially unaffected by the coating process.

EXAMPLES 3-7

For these examples a series of coated polyvinyl chloride films were prepared using compositions in which the ratio of terpolymer resin to "Chlorowax" 70 was varied, the plasticizer "Santicizer" B-16 being 18.2%. The coatings were applied by the method shown in Example 1 by dissolving 22.5 parts of the specified mixture consisting of terpolymer, "Chlorowax" 70 and plasticizer in 78 parts benzene and 50 parts of 2-methoxy-1-ethanol. The compositions and the room temperature seal strengths measured after heat-sealing at 70° C. and at 80° C. of films having a coated side of one film towards a coated side of a second film is summarized in Table I, which follows.

*Table I*

| Ex. | Composition (Weight percent) | | | Heat-Seal Strength (grams/1.5") | |
|---|---|---|---|---|---|
| | Terpolymer | "Chlorowax" 70 | Plasticizer | 70° C. | 80° C. |
| 3 | 72.7 | 9.1 | 18.2 | 0 | 400 |
| 4 | 45.4 | 36.4 | 18.2 | 115 | 750 |
| 5 | 36.4 | 45.4 | 18.2 | 220 | 795 |
| 6 | 27.2 | 54.5 | 18.2 | 440 | 570 |
| 7 | 20.0 | 61.8 | 18.2 | 375 | 500 |

EXAMPLES 8-11

These examples give the heat-seal properties of polyvinyl chloride films coated with compositions containing various amounts of plasticizer. The coatings were prepared and applied by methods identical to those of the preceding examples. The plasticizer used with Examples 8 and 9 was "Santicizer" B-16, while with Examples 10 and 11, a mixture of "Resoflex" R-296 and dicyclohexyl phthalate was used. The results of this work are summarized in Table II.

*Table II*

| Ex. | Composition (Weight percent) | | | Heat-Seal Strength (grams/1.5") | |
|---|---|---|---|---|---|
| | Terpolymer | "Chlorowax" 70 | Plasticizer | 70° C. | 80° C. |
| 8 | 44.4 | 55.6 | 0.0 | 0 | 480 |
| 9 | 40.0 | 50.0 | 10.0 | 640 | 580 |
| 5 | 36.4 | 45.4 | 18.2 | 220 | 795 |
| 10 | 44.2 | 29.4 | 26.3 | 800 | 800 |
| 11 | 37.8 | 25.0 | 37.2 | 800 | 800 |

EXAMPLE 12

This example describes applying the coating composition of the invention to an oriented polyvinyl chloride film by the melt extrusion technique.

A composition consisting of 300 parts of the terpolymer resin of the preceding examples, 72 parts "Santicizer" B-16, 8 parts "paraplex" G-62 (an epoxidized soy bean oil), 180 parts "Chlorowax" 70, 4 parts of a mercapto tin compound as thermal stabilizer, and 10 parts "Armid" HT as slip agent was prepared by mixing the ingredients on a rubber mill at 150° C. The resulting coalesced com-

---

[8] A plasticizer consisting of butyl phthallyl butyl glycolate as listed in Zimmerman and Levine, Handbook of Material Trade Names, Industrial Research Services, Inc., 1953.

[9] "Gobinyle" C-1, KW-62 manufactured by St. Gobain of France.

[10] "Thermolite" 31, a tin-based organic compound used as a stabilizer for polyvinyl chloride resins as listed in Zimmerman and Levine, Handbook of Material Trade Names, Supp. II, Industrial Research Services, Inc., 1957.

[11] "Paraplex" G-62, a high molecular weight polyester referred to in Modern Plastics-Encyclopedia Issue for 1959 (Issued September 1958).

position was mechanically broken up and fed into the hopper of a conventional one inch diameter extruder. The extruder was fitted with a six inch wide center fed flat die having a lip opening of 5 mils. The melt temperature was 150° C.

The molten composition was fed onto the surface of an oriented polyvinyl chloride film and immediately passed between a chrome plated chill wheel maintained at a temperature below 20° C., and a silicone rubber coated press roll held against the chill wheel with a force of fifty pounds per inch. A one inch air gap was used between the hopper lip and the chill wheel. The coated side of the film faced the chrome plated chill wheel. The resulting film was then wound up. The press roll and chill wheel were operated at a speed such that the film passed through the nip at a rate of 42 feet per minute. This resulted in the coating melt receiving a drawdown of 10 to 1, and gave a final film having a coating 0.5 mil thick, corresponding to a unit coating weight of 18 grams per square meter.

The composition used fed smoothly into the extruder, and showed excellent draw properties with no tendency towards rupture during the drawdown. The coated film had a sparkling clear, colorless appearance essentially identical to that of the uncoated film.

The coated film was heat-sealed to itself at 80° C., giving a seal strength of 1050 grams per 1.5 inches when the coated side was sealed against the coated side. When the coated side was sealed against the uncoated side, the seal strength was greater than 600 grams per 1.5 inches. The coated film had good slip properties and satisfactory blocking characteristics. The adhesion of the coating to the base film was satisfactory. The physical properties of the base sheet were essentially unaffected by the coating process.

A coating composition essentially identical to that of Example 2 was prepared. A length of two-way stretched, oriented crystalline polypropylene film which had been surface treated by chlorination essentially as outlined in U.S. Patent 2,502,841, was two-side coated by a method essentially identical to that described in Example 1.

The resulting coated film was clear, colorless and had excellent surface properties. The adhesion of the coating to the base film was satisfactory. The strength of heat-seals made at 80° C. with coated side to coated side was 560 grams per 1.5 inches. Seals made at 80° C. with the coated surface towards the uncoated but treated surface were 320 grams per 1.5 inches. The uncoated film did not seal at this temperature.

What is claimed is:
1. A coating composition comprising 20–60% by weight of a terpolymer of a vinyl halide, a vinyl ester of a lower saturated fatty acid, and an aliphatic alpha, beta-mono-olefinic carboxylic acid, said terpolymer containing 60–95% by weight of combined vinyl halide and 0.1–10% of said acid, 15–70% of a chlorinated hydrocarbon microcrystalline wax melting at a temperature between about 50° C. and about 100° C. and 5–40% of a plasticizer for said terpolymer.

2. A coating composition as in claim 1 wherein said vinyl halide is vinyl chloride.

3. A coating composition as in claim 1 wherein said vinyl ester is vinyl acetate.

4. A coating composition as in claim 1 wherein said aliphatic alpha, beta-mono-olefinic carboxylic acid is maleic acid.

5. A coating composition as in claim 1 wherein said plasticizer is selected from the group consisting of phthalate esters, adipate esters, sebacate esters, polyaryl phosphates and polyalkyl phosphates.

6. A coating composition as in claim 1 wherein said microcrystalline wax is a solid chlorinated paraffin.

7. A coating composition as in claim 1 wherein said microcrystalline wax is a solid chlorinated naphthalene.

8. A coating composition comprising 20–60% by weight of a terpolymer of vinyl chloride, vinyl acetate, and maleic acid, said terpolymer containing 80–90% vinyl chloride and 0.3–3% of maleic acid, 15–70% of a chlorinated hydrocarbon microcrystalline wax melting at a temperature between about 50° C. and about 100° C. and 5–40% of a plasticizer for said terpolymer.

9. A heat-sealable thermoplastic polymeric film comprising a base thermoplastic polymeric film coated with a composition containing 20–60% by weight of a terpolymer of a vinyl halide, a vinyl ester of a lower saturated fatty acid, and an aliphatic alpha, beta-mono-olefinic carboxylic acid, said terpolymer containing 60–95% by weight of combined vinyl halide and 0.1–10% of said acid, 15–70% of a chlorinated hydrocarbon microcrystalline wax melting at a temperature between about 50° C. and about 100° C. and 5–40% of a plasticizer for said terpolymer.

10. A heat-sealable thermoplastic polymeric film comprising an oriented polyvinyl chloride film coated with a composition containing 20–60% by weight of a terpolymer of a vinyl halide, a vinyl ester of a lower saturated fatty acid, and an aliphatic alpha, beta-mono-olefinic carboxylic acid, said terpolymer containing 60–95% by weight of combined vinyl halide and 0.1–10% of said acid, 15–70% of a chlorinated hydrocarbon microcrystalline wax melting at a temperature between about 50° C. and about 100° C. and 5–40% of a plasticizer for said terpolymer.

11. A coated film as in claim 10 wherein said vinyl halide is vinyl chloride.

12. A coated film as in claim 10 wherein said vinyl ester is vinyl acetate.

13. A coated film as in claim 10 wherein said acid is maleic acid.

14. A coated film as in claim 10 wherein said coating composition comprises 20–60% by weight of a terpolymer of vinyl chloride, vinyl acetate, and maleic acid, said terpolymer containing 80–90% vinyl chloride and 0.3–3% of maleic acid, 15–70% of a chlorinated hydrocarbon microcrystalline wax melting at a temperature between about 50° C. and about 100° C. and 5–40% of a plasticizer for said terpolymer.

15. A coated film as in claim 10 wherein said plasticizer is selected from the group consisting of phthlate esters, adipate esters, sebacate esters, polyaryl phosphates and polyalkyl phosphates.

16. A coated film as in claim 10 wherein said microcrystalline wax is a solid chlorinated paraffin.

17. A coated film as in claim 10 wherein said microcrystalline wax is a solid chlorinated naphthalene.

18. A process for improving the heat-sealability of an oriented polyvinyl chloride film which comprises coating said film with a composition containing 20–60% by weight of a terpolymer of a vinyl halide, a vinyl ester of a lower saturated fatty acid, and an aliphatic alpha, beta-mono-olefinic carboxylic acid, said terpolymer containing 60–95% by weight of combined vinyl halide and 0.1–10% of said acid, 15–70% of a chlorinated hydrocarbon microcrystalline wax melting at a temperature between about 50° C. and about 100° C. and 5–40% of a plasticizer for said terpolymer; and drying said coated film.

References Cited in the file of this patent

UNITED STATES PATENTS

| | | |
|---|---|---|
| 2,329,456 | Campbell | Sept. 14, 1943 |
| 2,391,621 | Powell et al. | Dec. 25, 1945 |
| 2,421,409 | Brookman et al. | June 3, 1947 |
| 2,624,718 | Bezman et al. | Jan. 6, 1953 |
| 2,667,464 | Greenhalgh | Jan. 26, 1954 |
| 2,864,783 | Cornwell | Dec. 16, 1958 |